(12) United States Patent
Yamashiro et al.

(10) Patent No.: US 10,419,873 B2
(45) Date of Patent: Sep. 17, 2019

(54) MOBILE COMMUNICATION SYSTEM AND ONBOARD TERMINAL

(71) Applicant: DENSO CORPORATION, Kariya, Aichi-pref. (JP)

(72) Inventors: Takahisa Yamashiro, Kariya (JP); Seigou Kumabe, Kariya (JP); Naoyuki Kida, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 70 days.

(21) Appl. No.: 15/531,675

(22) PCT Filed: Dec. 17, 2015

(86) PCT No.: PCT/JP2015/006299
§ 371 (c)(1),
(2) Date: May 30, 2017

(87) PCT Pub. No.: WO2016/103660
PCT Pub. Date: Jun. 30, 2016

(65) Prior Publication Data
US 2018/0279068 A1     Sep. 27, 2018

(30) Foreign Application Priority Data

Dec. 26, 2014 (JP) ................................. 2014-264418

(51) Int. Cl.
*H04W 4/02* (2018.01)
*H04W 4/04* (2009.01)
(Continued)

(52) U.S. Cl.
CPC ............... *H04W 4/02* (2013.01); *H04W 4/04* (2013.01); *H04W 4/44* (2018.02); *H04W 48/02* (2013.01); *H04W 48/12* (2013.01)

(58) Field of Classification Search
CPC ......... H04W 4/02; H04W 4/44; H04W 48/02; H04W 48/12
(Continued)

(56) References Cited

U.S. PATENT DOCUMENTS 8,761,676 B2   6/2014 Hu et al.
2005/0148347 A1   7/2005 Nagai
(Continued)

FOREIGN PATENT DOCUMENTS

CN        103415082 A       11/2013
JP        2005050248 A  *   2/2005
(Continued)

OTHER PUBLICATIONS

IEEE WAVE (Wireless Access in Vehicular Environment) (Dec. 11, 2013) (Year: 2013).*

(Continued)

*Primary Examiner* — Mark H Rinehart
*Assistant Examiner* — Kokou R Detse
(74) *Attorney, Agent, or Firm* — Harness, Dickey & Pierce, P.L.C.

(57) ABSTRACT

A mobile communication system is provided. A service provider terminal distributes service initiation information by using a control channel. Upon receipt of the service initiation information, an onboard terminal determines, based on service type information included in the service initiation information and available service type stored in the onboard terminal, whether the service provided by the service provider terminal is available to the onboard terminal itself. The onboard terminal determines, based on target terminal information included in the service initiation information and determination information acquired by the onboard terminal, whether the onboard terminal itself is an onboard terminal targeted for the service.

9 Claims, 6 Drawing Sheets

(51) Int. Cl.
*H04W 48/02* (2009.01)
*H04W 48/12* (2009.01)
*H04W 4/44* (2018.01)

(58) Field of Classification Search
USPC .......................................................... 370/329
See application file for complete search history.

(56) References Cited

U.S. PATENT DOCUMENTS

2011/0306353 A1    12/2011    Kim et al.
2015/0358481 A1    12/2015    Nagata et al.

FOREIGN PATENT DOCUMENTS

JP        2009212771 A      9/2009
JP        2014131236 A      7/2014
WO    WO-2004089008 A1 *   10/2004     ........... G08G 1/0962

OTHER PUBLICATIONS

"IEEE Guide for Wireless Access in Vehicular Environments (WAVE) Architecture", IEEE Vehicular Technology Society, IEEE Std 1609.0 2013.

* cited by examiner

MOBILE COMMUNICATION SYSTEM AND ONBOARD TERMINAL

CROSS-REFERENCE TO RELATED APPLICATIONS

This application is a U.S. National Phase Application under 35 U.S.C. 371 of International Application No. PCT/JP2015/006299 filed on Dec. 17, 2015 and published in Japanese as WO 2016/103660 A1 on Jun. 30, 2016. This application is based on and claims the benefit of priority from Japanese Patent Application No. 2014-264418, filed on Dec. 26, 2014. The entire disclosures of all of the above applications are incorporated herein by reference.

TECHNICAL FIELD

The present disclosure relates to a mobile communication system that permits a communication terminal mounted in a vehicle (i.e., an onboard terminal) to wirelessly communicate with at least either one of a communication terminal installed along a road and an onboard terminal mounted in a different vehicle. The present disclosure also relates to an onboard terminal used in the mobile communication system.

BACKGROUND ART

A communication architecture compliant with WAVE (Wireless Access in Vehicular Environment) is defined in Non-Patent Literature 1. WAVE is a standard for communication between a communication terminal mounted in a vehicle (hereinafter referred to as an onboard terminal) and an onboard terminal mounted in a different vehicle or a communication terminal installed along a road (hereinafter referred to as a roadside unit).

According to Non-Patent Literature 1, two types of channels, namely, a control channel and a service channel, are used to establish communication between the onboard terminal and a service provider terminal such as a roadside unit. The service provider terminal is a communication terminal managed by a service provider that provides predetermined services.

The service channel is used to transmit and receive information for providing (and receiving) services. The control channel is used to distribute, for example, information (WSA (Wave Service Advertisement)) for initiating communication on the service channel between the onboard terminal and the service provider terminal. A plurality of frequencies are prepared for use on the service channel. The WSA includes service type information and channel information. The service type information indicates the type of service to be provided by a distributor of the WSA. The channel information is used to identify a service channel (i.e., frequency) that is used to provide the service.

The service provider terminal uses the control channel to successively broadcast a WSA for a service to be provided by the service provider terminal. If, for example, a response to the WSA is returned from an onboard terminal, the service provider terminal starts communicating with the onboard terminal by using the service channel.

Upon receipt of a WSA, the onboard terminal performs a process based on the service type information included in the WSA. More specifically, the onboard terminal references the service type information in the received WSA to determine whether the type of service to be provided by a distributor of the WSA is available to the onboard terminal. If the type of service is available to the onboard terminal, the onboard terminal opens a predetermined service channel indicated by the received WSA. Opening a service channel is initiating communication with the distributor of the WSA by using a predetermined service channel. By contrast, if the type of service is unavailable to the onboard terminal, the onboard terminal does not open the service channel.

The onboard terminal (or a user of the onboard terminal) may receive payment services for paying for services or goods received, for example, at a store.

PRIOR ART LITERATURE

Non-Patent Literature

Non-Patent Literature 1: IEEE 1609.0 (Guide for Wireless Access in Vehicular Environment)

SUMMARY OF INVENTION

Under normal conditions, an area to which the service provider terminal distributes a WSA is preferably identical with an area that is passed by a vehicle (more precisely, an onboard terminal) targeted for a service. However, the WSA distributed from the service provider terminal is not always within an area that is passed by the vehicle targeted for the service. In some cases, a WSA transmitted from the service provider terminal may be reflected from the body of a large vehicle and delivered into an area (e.g., an opposite lane) where a vehicle irrelevant to the service travels. Consequently, the onboard terminal may receive, in some cases, a WSA for a service that is available to but unnecessary for the onboard terminal.

The WSA for a service unnecessary for the onboard terminal is, for example, a WSA distributed from a service provider terminal that provides a service for a vehicle traveling in a lane (e.g., an opposite lane) different from a lane where an onboard-terminal-mounted vehicle (hereinafter referred to as the subject vehicle) is traveling.

In a conventional configuration, the onboard terminal references the service type information in the WSA to determine whether or not to open a service channel indicated by the WSA. Therefore, even if a received WSA is for a service unnecessary for the onboard terminal, the onboard terminal opens a service channel indicated by the WSA as far as the service type indicated by the WSA is available to the onboard terminal. That is, there may arise a case where the onboard terminal opens the service channel for the service unnecessary for the onboard terminal.

Incidentally, in the case of services such as payment services, the stability of communication between the onboard terminal and the service provider terminal, which provides such services, is important. Accordingly, for a situation where a service channel for a predetermined service is opened by the onboard terminal, an appropriate scheme may be devised to inhibit the opening of a different service channel until a communication termination process is completed according to a predetermined communication procedure (including, for example, a timeout) for the purpose of increasing the stability of communication between the onboard terminal and the service provider terminal.

In a situation where the above scheme is adopted, if the onboard terminal receives a WSA for a service unnecessary for the onboard terminal and opens a service channel for the unnecessary service, the other service channels cannot be opened until the termination process for relevant communication is completed. Thus, it is anticipated that, when the onboard terminal opens a service channel for a service unnecessary for the onboard terminal, the onboard terminal may be unable to open a service channel for a service necessary for the onboard terminal or may end up opening such a service channel with a delay.

An object of the present disclosure is to provide a mobile communication system that is capable of inhibiting an onboard terminal from initiating communication on a service channel with a service provider terminal that provides a service unnecessary for the onboard terminal. Another object is to provide an onboard terminal that is used in the mobile communication system.

A mobile communication system in an aspect of the present disclosure comprises: at least one onboard terminal that is used in a vehicle; and at least one service provider terminal that wirelessly communicates with the onboard terminal to perform a series of processes for providing a predetermined service to the onboard terminal. The service provider terminal includes: a provider service channel communicator that communicates with the onboard terminal to provide the service by using any one of a plurality of preassigned service channels; and a provider control channel communicator that distributes service initiation information for initiating communication on the service channel by using a preassigned control channel, the control channel being different from the service channels. The service initiation information includes: service type information that indicates type of the service; service channel information that enables the onboard terminal having received the service initiation information to identify, of the plurality of service channels, the service channel used for the service provider terminal to communicate with the onboard terminal; and target terminal information indicative of a condition for the onboard terminal targeted for the service. The onboard terminal includes: an onboard control channel communicator that communicates with the service provider terminal by using the control channel and receives at least the service initiation information; an onboard service channel communicator that communicates with the service provider terminal by using one of the plurality of service channels determined by the service channel information included in the service initiation information received by the onboard control channel communicator; a service memory that memorizes type of service available to the onboard terminal itself; a service type determiner that determines, based on the service type information included in the service initiation information and on the type of service available to the onboard terminal itself stored in the service memory, whether the service provided by the service provider terminal is available to the onboard terminal itself; a determination information acquirer that acquires determination information, the determination information being information about the onboard terminal itself and used to determine whether the onboard terminal itself is an onboard terminal targeted for the service from the service provider terminal; and a service target determiner that determines, based on the target terminal information included in the service initiation information and on the determination information acquired by the determination information acquirer, whether the onboard terminal itself is the onboard terminal targeted for the service. When the service type determiner determines that the service provided by the service provider terminal is available to the onboard terminal itself and the service target determiner determines that the onboard terminal itself is the onboard terminal targeted for the service, the onboard service channel communicator initiates communication with the service provider terminal by using the service channel. When the service type determiner determines that the service provided by the service provider terminal is not available to the onboard terminal itself or when the service target determiner determines that the onboard terminal itself is not the onboard terminal targeted for the service, the onboard service channel communicator does not initiate communication with the service provider terminal by using the service channel.

In the above-described configuration, the service provider terminal uses the control channel to distribute the service initiation information including the service type information, the service channel information, and the target terminal information. Upon receipt of the service initiation information, the onboard terminal causes the service type determiner and the service target determiner to make various determinations based on the information included in the service initiation information.

More specifically, the service type determiner determines, based on the service type information included in the received service initiation information, whether a service provided by a service provider terminal that has distributed the service initiation information (hereinafter referred to as the distributor) is available to the onboard terminal itself.

The service target determiner determines, based on the target terminal information included in the service initiation information and the determination information acquired by the determination information acquirer, whether the onboard terminal itself is to receive a service provided by the distributor.

The condition for an onboard terminal that is designated as a service target by the target terminal information may be, for example, position information about the onboard terminal or the movement direction or speed of the onboard terminal. If the position information about the onboard terminal is used as the condition for an onboard terminal to be designated as a service target, the target terminal information may indicate a service provision area where a service is to be provided.

In the above instance, the determination information acquirer may acquire the current position of the onboard terminal itself. Further, if the onboard terminal itself exists in the service provision area, the service target determiner may determine that the onboard terminal itself is to receive the service. By contrast, if the onboard terminal itself exists outside the service provision area, the service target determiner may determine that the onboard terminal itself is not to receive the service.

When the service target determiner determines that the onboard terminal itself is not an onboard terminal targeted for the service, the onboard service channel communicator does not initiate communication on a service channel with the service provider terminal.

That is, even when the onboard terminal receives the service initiation information about a service available to the onboard terminal itself, the onboard terminal does not initiate communication on a service channel with the service provider terminal if the service target determiner determines that the onboard terminal itself is not to receive the service.

The target terminal information indicates the condition for an onboard terminal targeted for the service. Therefore, when the service target determiner determines that the onboard terminal itself is not to receive the service, it is highly probable that the service associated with the received service initiation information is unnecessary for the onboard terminal itself.

Consequently, the above-described configuration enables the onboard terminal to suppress the initiation of communication on a service channel with a service provider terminal that provides services unnecessary for the onboard terminal itself.

Further, even if, in a situation where communication on a service channel with a service provider terminal is initiated by the onboard terminal, the onboard terminal is unable to initiate communication on another service channel with another service provider terminal until the preceding communication is terminated according to a predetermined communication procedure, the above-described configuration makes it difficult to initiate communication with a service channel for a service unnecessary for the onboard terminal itself. Consequently, even when the service initiation information for an unnecessary service is received, the above-described configuration reduces the possibility of initiating communication for a necessary service with a delay or failing to initiate such communication.

In another aspect of the present disclosure, an onboard terminal performs a series of processes to receive a predetermined service by wirelessly communicating with a service provider terminal adapted to provide the predetermined service and comprises: an onboard control channel communicator that communicates with the service provider terminal by using a preassigned control channel and receives service initiation information distributed from the service provider terminal; and an onboard service channel communicator that communicates with the service provider terminal by using one of a plurality of preassigned service channels, the service channels being different from the control channel. The service initiation information includes: service type information that indicates type of the service provided by the service provider terminal; service channel information that enables the onboard terminal to identify, of the plurality of service channels, the service channel used for the service provider terminal to communicate with the onboard terminal; and target terminal information that indicates a condition for a communication terminal targeted for the service. The onboard terminal further comprises: a service memory that stores type of service available to the onboard terminal itself; a service type determiner that determines, based on the service type information included in the service initiation information and on the type of service available to the onboard terminal itself stored in the service memory, whether the service provided by the service provider terminal is available to the onboard terminal itself; a determination information acquirer that acquires determination information, the determination information being information about the onboard terminal itself and used to determine whether the onboard terminal itself is a communication terminal adapted to receive the service from the service provider terminal; and a service target determiner that determines, based on the target terminal information included in the service initiation information and on the determination information acquired by the determination information acquirer, whether the onboard terminal itself is a communication terminal targeted for the service. When the service type determiner determines that the service provided by the service provider terminal is available to the onboard terminal itself and the service target determiner determines that the onboard terminal itself is the communication terminal targeted for the service, the onboard service channel communicator initiates communication with the service provider terminal by using one of the service channels determined by the service channel information included in the service initiation information. When the service type determiner determines that the service provided by the service provider terminal is not available to the onboard terminal itself or when the service target determiner determines that the onboard terminal itself is not the communication terminal targeted for the service, the onboard service channel communicator does not initiate communication with the service provider terminal by using the service channel determined by the service channel information included in the service initiation information, the service channel being one of the plurality of service channels.

The above-described onboard terminal is configured to operate as an onboard terminal for use in the earlier-described mobile communication system. That is, the above-described configuration provides the same advantageous effects as the mobile communication system.

BRIEF DESCRIPTION OF DRAWINGS

The above and other objects, features, and advantages of the present disclosure will become more apparent from the following detailed description made with reference to the accompanying drawings. In the drawings.

DESCRIPTION OF EMBODIMENT

Figure 1:
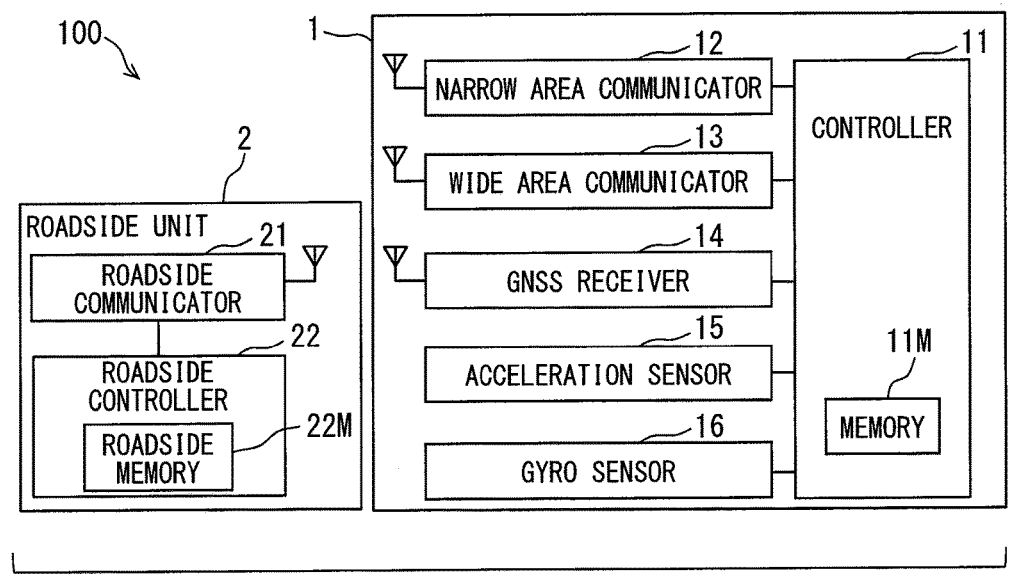
FIG. 1 is a block diagram illustrating an outline configuration of a mobile communication system according to an embodiment of the present disclosure.

An embodiment of the present disclosure will now be described with reference to the accompanying drawings. FIG. 1 is a diagram illustrating an exemplary outline configuration of a mobile communication system 100 according to the present embodiment. As illustrated in FIG. 1, the mobile communication system 100 includes a roadside unit 2 and an onboard unit 1. The roadside unit 2 is a communication terminal installed along a road. The onboard unit 1 is a communication terminal mounted in a vehicle. The onboard unit 1 corresponds to an onboard terminal.

For the sake of convenience, FIG. 1 shows only one roadside unit 2. However, the mobile communication system 100 may include a plurality of roadside units 2. The onboard unit 1 is mounted in each of a plurality of vehicles. Therefore, the mobile communication system 100 includes a plurality of onboard units 1. When the onboard unit 1 and the roadside unit 2 are not to be distinguished from each other, they are hereinafter simply referred to as the communication terminals.

The onboard unit 1 and the roadside unit 2 establish well-known road-to-vehicle communication in compliance with the WAVE (Wireless Access in Vehicular Environment) standard described in Non-Patent Literature 1. Further, the onboard unit 1 may establish vehicle-to-vehicle communication with a different onboard unit 1 in compliance with the WAVE standard. An area where each communication terminal is able to establish wireless communication (this area will be hereinafter referred to as the wireless communication area) may be designed as appropriate.

An identification code (referred to as a terminal ID) for identifying a plurality of communication terminals is set for each of the communication terminals (i.e., onboard unit 1 and roadside unit 2) in the mobile communication system 100. Data transmitted from a communication terminal includes its terminal ID. Therefore, upon receipt of data, a communication terminal is able to identify a transmission source terminal by the terminal ID included in the data.

The communication terminals establish road-to-vehicle communication and vehicle-to-vehicle communication by using preassigned frequencies (which may be referred to as channels). More specifically, communication between the onboard unit 1 and the roadside unit 2 (i.e., road-to-vehicle communication) is established by using a control channel and one of a plurality of service channels.

The control channel is for broadcasting. The control channel is used when, for example, the roadside unit 2 transmits a WSA (Wave Service Advertisement), which is a message for initiating communication on a predetermined service channel between the onboard unit 1 and the roadside unit 2.

The service channels are used to communicate with a specific communication terminal existing in the wireless communication area. That is, unicast or multicast communication is established on the service channels. The service channels are used when, for example, the onboard unit 1 and the roadside unit 2 transmit and receive information related to the provision (or reception) of a predetermined service.

It is assumed here, for example, that the mobile communication system 100 includes four service channels, namely, a first service channel, a second service channel, a third service channel, and a fourth service channel. The control channel and the service channels are implemented by using different frequencies.

It is assumed, for the sake of convenience, that the first service channel, the second service channel, the third service channel, and the fourth service channel use a first frequency, a second frequency, a third frequency, and a fourth frequency, respectively, and that the control channel uses a fifth frequency. The first, second, third, fourth, and fifth frequencies all belong to a 5.8 GHz band or a 5.9 GHz band.

In a communication terminal, the service channels may be identified by an assigned number (channel number). Further, the service channels and the control channel may be implemented by using not only frequencies in the 5.8 GHz or 5.9 GHz band but also frequencies in a 2.4 GHz band or frequencies in a different frequency band. Furthermore, each channel may be implemented by applying a time division multiplexing technology to the same frequency. The roadside unit 2 and the onboard unit 1 will be outlined below together with their configurations.

(Roadside Unit 2)

First of all, the roadside unit 2 will be outlined. The roadside unit 2 establishes road-to-vehicle communication with an onboard unit 1 existing in the wireless communication area formed by the roadside unit 2, and provides predetermined services by distributing various information to the onboard unit 1 and acquiring various information from the onboard unit 1. The roadside unit 2 corresponds to an example of a service provider terminal.

The roadside unit 2 may be disposed at a position suitable for services provided by the roadside unit 2. For example, the roadside unit 2 may be disposed at an intersection, along a road (a so-called link) connecting one intersection to another, or at an entrance and exit of a specific institution (e.g., parking lot, store, or toll road). The wireless communication area of the roadside unit 2 is preferably formed to include an area that can be passed through by a vehicle to which services are to be provided by the roadside unit 2, and exclude an area that is passed through by a vehicle to which the services are not to be provided.

In the present embodiment, the onboard unit 1 and a vehicle in which the onboard unit 1 is mounted correspond to each other on a one-to-one basis. Even when the subject or object of an operation is the onboard unit 1 in a strict sense, the configuration and operation of the present embodiment will be described on the assumption that a vehicle in which the onboard unit 1 is mounted is the subject or object of the operation. For example, a vehicle to which the roadside unit 2 is to provide services signifies the onboard unit 1 (or its user) to which the services are to be provided, and a vehicle to which the roadside unit 2 is not to provide services signifies the onboard unit 1 (or its user) to which the services are not to be provided.

When, for instance, the roadside unit 2 provides a traffic information distribution service for distributing driving support information, which helps a driver recognize and determine a traffic situation around the roadside unit 2, the roadside unit 2 may be disposed at an intersection or along a road. The driving support information is, for example, congestion information about an area around the roadside unit and information about vehicles, pedestrians, and obstacles that are in an area around the roadside unit and in a blind spot of the driver. The area around the roadside unit may be a range that is appropriately designed based on the position of the roadside unit.

If the roadside unit 2 distributes driving support information related only to a vehicle traveling in a particular lane, the wireless communication area of the roadside unit 2 is preferably formed to cover no other lane.

If the roadside unit 2 provides a payment service for paying for services or goods received at a predetermined institution, the roadside unit 2 may be installed to form a desired wireless communication area in the vicinity of an entrance and exit of the institution.

The institution that provides a payment service by using the roadside unit 2 is, for example, a toll parking lot and various stores such as a restaurant, a bank, a laundry, and a gas station. The roadside unit 2 may be disposed at an entrance and exit of a toll road and used to establish road-to-vehicle communication for billing the driver of a vehicle for traveling on the toll road based on the use of the toll road (e.g., traveled section and time zone). Further, the roadside unit 2 may provide a service to check for an abnormality in the onboard unit 1 and in a vehicle in which the onboard unit 1 is mounted.

The roadside unit 2 uses the control channel to broadcast a WSA successively (e.g., at 100 millisecond intervals). When, for example, the onboard unit 1 responds to the WSA, the roadside unit 2 initiates communication on a service channel with the onboard unit 1. The roadside unit 2 then performs a series of processes to provide services such as a payment service by establishing communication on the service channel with the onboard unit 1 to transmit and receive various information to and from the onboard unit 1.

As illustrated in FIG. 1, the above-described roadside unit 2 includes a roadside communicator 21 and a roadside controller 22. The roadside communicator 21 and the roadside controller 22 are communicatively connected to each other.

The roadside communicator 21 includes an antenna that is capable of transmitting and receiving radio waves having the first to fifth frequencies, and establishes road-to-vehicle communication through the antenna with the onboard unit 1 existing in the wireless communication area formed by the roadside unit 2. The roadside communicator 21 not only demodulates a signal received from the onboard unit 1 and outputs the demodulated signal to the roadside controller 22, but also modulates data inputted from the roadside controller 22, converts the modulated data to radio waves, and transmits the radio waves.

The roadside communicator 21 has two operating modes, namely, a mode for establishing communication on the control channel and a mode for establishing communication on a service channel. That is, the communication on the control channel with the onboard unit 1 and the communication on a service channel with the onboard unit 1 are both established through the roadside communicator 21.

Figure 2:
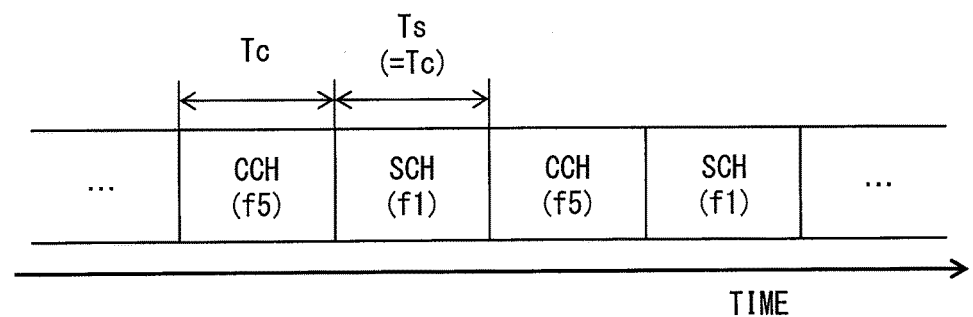
FIG. 2 is a diagram illustrating the flow of communication established by a roadside unit.

FIG. 2 is a conceptual diagram illustrating the flow of communication established by the roadside unit 2. As illustrated in FIG. 2, the roadside unit 2 switches between communication on the control channel and communication on a service channel at predetermined time intervals (e.g., at 50 millisecond intervals). Switching between the mode for establishing communication on the control channel and the mode for establishing communication on a service channel may be performed in compliance with an instruction from the roadside controller 22.

The period of time Tc during which the control channel is used for communication and the period of time Ts during which a service channel is used for communication may be designed as appropriate. Both of these periods of time may be dynamically changed as needed. Further, communication on the control channel may be maintained until the reception of a response from the onboard unit 1 to the WSA successively transmitted on the control channel. The service channel (one of the first to fourth service channels) to be used may be preset for each roadside unit (or for each service). Here, it is assumed that the roadside unit 2 is preset to use the first service channel.

The roadside controller 22 is configured as a common computer that includes a well-known CPU, a nonvolatile memory such as a ROM or a flash memory, a volatile memory such as a RAM, an I/O device, and a bus line connecting these elements (none of these elements is shown).

A roadside memory 22M included in the roadside controller 22 is a nonvolatile storage medium and implemented, for example, by a flash memory or ROM included in the roadside controller 22. The roadside memory 22M stores, for example, a program module and data for performing various processes and a terminal ID assigned to the roadside unit 2. The roadside memory 22M also stores information about the service channels (channel number, etc.) used to provide services.

Figures 3, 4:
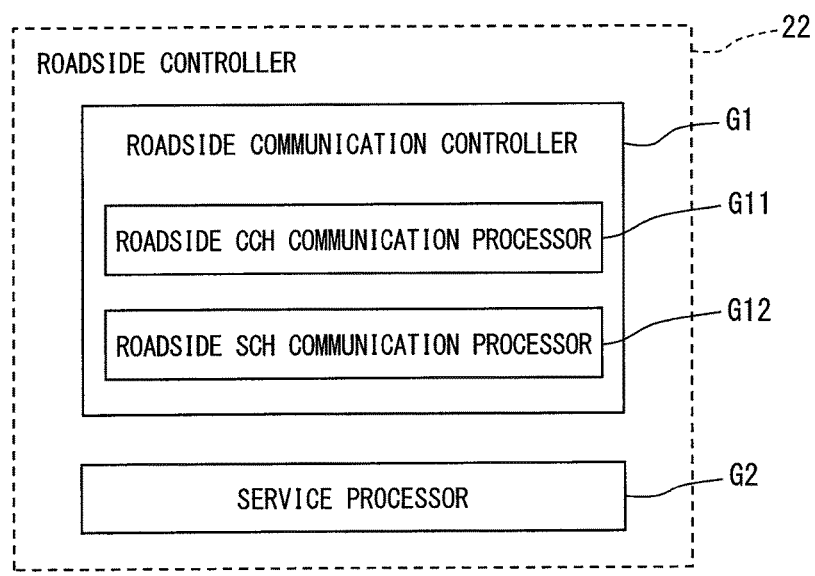
FIG. 3 is a block diagram illustrating an exemplary outline configuration of a roadside controller.
FIG. 4 is a diagram illustrating an exemplary outline configuration of a WSA.

The roadside controller 22 is a functional block that is implemented by executing the above-mentioned program module. As illustrated in FIG. 3, the roadside controller 22 includes a roadside communication controller G1 and a service processor G2. Some or all functions executed by the roadside controller 22 may be implemented by hardware such as one IC or a plurality of ICs.

The roadside communication controller G1 controls the operation of the roadside communicator 21 and switches between communication on the control channel and communication on a service channel. The roadside communication controller G1 generates data to be transmitted from the roadside communicator 21 based on the operating mode of the roadside communicator 21, and causes the roadside communicator 21 to transmit the generated data. Further, the roadside communication controller G1 acquires data received by the roadside communicator 21 and supplies the acquired data to the service processor G2.

The roadside communication controller G1 is subdivided into two functional blocks, namely, a roadside CCH communication processor G11 and a roadside SCH communication processor G12. CCH denotes the control channel, and SCH denotes a service channel.

The roadside CCH communication processor G11 exercises control over communication on the control channel. That is, the roadside CCH communication processor G11 corresponds to a provider control channel communicator. The roadside CCH communication processor G11 generates data to be transmitted on the control channel, and causes the roadside communicator 21 to transmit the generated data. Further, the roadside CCH communication processor G11 acquires data that is received while the roadside communicator 21 is engaged in communication on the control channel, and supplies the acquired data to the service processor G2.

For example, the roadside CCH communication processor G11 generates a WSA for a service to be provided by the subject terminal, and causes the roadside communicator 21 to transmit the generated WSA. This WSA corresponds to service initiation information.

FIG. 4 is a diagram illustrating an exemplary configuration of the WSA. As illustrated in FIG. 4, the WSA includes a header, service type information, channel use information, and target vehicle information. The header is information that causes a receiving-end communication terminal (i.e., onboard unit 1) to recognize that received data is a WSA. The header may include information that indicates the version of the WAVE standard, and information that distinguishes the WSA from a different message used by the WAVE standard.

The service type information indicates the type of service to be provided by the roadside unit 2. The service type information is represented by a service ID that is preassigned to each service type. Upon receipt of a WSA, the onboard unit 1 references the service type information included in the WSA to identify the type of service corresponding to the WSA, that is, identify the type of service provided by the roadside unit 2 from which the WSA is distributed.

The channel use information indicates the channel number of a service channel (one of the first to fourth service channels) that the roadside unit 2 uses to provide a service. The onboard unit 1 references the channel use information to identify the service channel that the roadside unit 2 uses to provide a service. The channel use information corresponds to service channel information.

The target vehicle information indicates a condition (target vehicle condition) for distinguishing between an onboard unit 1 targeted for service provision from the roadside unit 2 (and a vehicle in which the onboard unit 1 is mounted) and an onboard unit 1 not targeted for service provision from the roadside unit 2 (and a vehicle in which the onboard unit 1 is mounted). The present embodiment assumes, as an example, that the target vehicle information indicates an area where a service is to be provided (hereinafter referred to as the service provision area).

The service provision area may be designed as appropriate to include an area that is passed through by a vehicle that is to establish communication to provide a service, and exclude an area that is passed through by a vehicle that is not to establish communication to provide a service. The target vehicle information serving as the information about the service provision area may indicate its boundary by using coordinate data such as latitude and longitude. The target vehicle information corresponds to target terminal information.

The roadside SCH communication processor G12 exercises control over communication on a predetermined service channel. That is, the roadside SCH communication processor G12 corresponds to a provider service channel communicator. For example, the roadside SCH communication processor G12 generates data to be transmitted on a service channel, and causes the roadside communicator 21 to transmit the generated data. Further, the roadside SCH communication processor G12 acquires data that is received while the roadside communicator 21 is engaged in communication on a service channel, and supplies the acquired data to the service processor G2.

Based on information supplied from the roadside communication controller G1, the service processor G2 provides a predetermined service (e.g., payment service) to an onboard unit 1 existing in the wireless communication area. In the present embodiment, a situation where the roadside unit 2 provides a service to the onboard unit 1 includes a mode in which the roadside unit 2 provides a service through the onboard unit 1 to a vehicle in which the onboard unit 1 is mounted or to an occupant of the vehicle.

(Onboard Unit 1)

The onboard unit 1 will now be described. Upon receipt of a WSA transmitted on the control channel 2 that meets predetermined conditions (detailed later), the onboard unit 1 initiates, based on the WSA, communication on a predetermined service channel with the roadside unit 2 from which the WSA is distributed. The onboard unit 1 then receives a service provided by the roadside unit 2 by transmitting and receiving various information on the service channel to and from the roadside unit 2. Initiating communication on a predetermined service channel with the roadside unit 2 may be hereinafter referred to as opening a service channel.

In the present embodiment, while the onboard unit 1 is engaged in communication on a service channel with a roadside unit 2, the onboard unit 1 does not establish communication on another service channel until the communication with the roadside unit 2 is terminated according to a predetermined termination procedure. The predetermined termination procedure includes a timeout process of terminating the communication with the roadside unit 2 when no response is returned from the roadside unit 2 for a predetermined period of time.

While a predetermined service channel is not open, the onboard unit 1 performs receiving the control channel or uses a certain service channel to establish vehicle-to-vehicle communication with a different onboard unit 1.

As illustrated in FIG. 1, the onboard unit 1 includes a controller 11, a narrow area communicator 12, a wide area communicator 13, a GNSS receiver 14, an acceleration sensor 15, and a gyro sensor 16. The controller 11 is communicatively connected to the narrow area communicator 12, the wide area communicator 13, the GNSS receiver 14, the acceleration sensor 15, and the gyro sensor 16.

The narrow area communicator 12 has an antenna that is capable of transmitting and receiving radio waves having the first to fifth frequencies, and uses the antenna to wirelessly communicate with a different communication terminal (e.g., roadside unit 2) existing in the wireless communication area. More specifically, the narrow area communicator 12 not only demodulates a signal received by the antenna and outputs the demodulated signal to the controller 11, but also modulates data inputted from the controller 11, converts the modulated data to radio waves, and transmits the radio waves.

As is the case with the roadside communicator 21, the narrow area communicator 12 has two operating modes, namely, a mode for establishing communication on the control channel and a mode for establishing communication on a service channel. In the onboard unit 1, the communication on the control channel and the communication on a service channel are both established through the narrow area communicator 12.

Switching from communication on the control channel to communication on a service channel and switching from communication on a service channel to communication on the control channel may be performed in compliance with an instruction from the controller 11. Further, the service channel (one of the first to fourth service channels) to be used for communication may also be determined in compliance with an instruction from the controller 11.

The wide area communicator 13 is connected to a public communication network and used to establish wide area communication. The wide area communicator 13 not only demodulates a received signal and supplies the demodulated signal to the controller 11, but also successively modulates a baseband signal inputted from the controller 11 and transmits data to a predetermined communication terminal connected to the public communication network.

The GNSS receiver 14 acquires data indicative of its current position by receiving radio waves from a satellite used in a GNSS (Global Navigation Satellite System). Current position information acquired by the GNSS receiver 14 may be expressed, for example, by latitude and longitude. Position information acquired by the GNSS receiver 14 is supplied to the controller 11 successively (e.g., at 100 millisecond intervals).

The acceleration sensor 15 detects acceleration that is exerted in the front-rear direction of a subject vehicle. The onboard unit 1 is assumed to be mounted in the subject vehicle in a predetermined posture so that the direction of acceleration detection by the acceleration sensor 15 coincides with the front-rear direction of the subject vehicle. Here, the subject vehicle is a vehicle in which the onboard unit 1 is mounted. The acceleration sensor 15 is preferably a three-axis acceleration sensor for detecting acceleration that is exerted in three orthogonal axial directions of the subject vehicle, namely, the front-rear direction, left-right direction, and up-down direction of the subject vehicle.

The gyro sensor 16 detects the angular speed of rotation around the vertical axis of the subject vehicle in a state where the onboard unit 1 is mounted in a predetermined posture.

The controller 11 is configured as a common computer that includes a well-known CPU, a nonvolatile memory such as a ROM or a flash memory, a volatile memory such as a RAM, an I/O device, and a bus line connecting these elements (none of these elements is shown).

A memory 11M included in the controller 11 is a nonvolatile storage medium that is implemented, for example, by a flash memory or ROM included in the controller 11. The memory 11M stores, for example, a program module and data for performing various processes and a terminal ID assigned to the onboard unit 1.

Data showing a service list, which is a list of services available to the onboard unit 1, is also stored in the memory 11M. The service list may be a list of service IDs representing services available to the onboard unit 1. The services available to the onboard unit 1 include services that are available through the onboard unit 1 to the subject vehicle or to an occupant of the subject vehicle. The memory 11M corresponds to a service memory.

Figure 5:
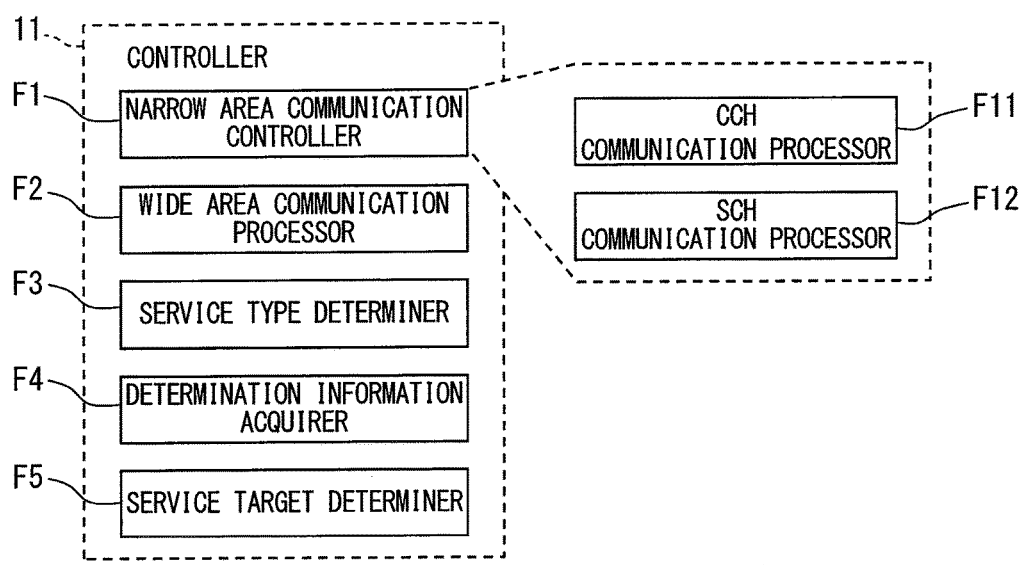
FIG. 5 is a block diagram illustrating an outline configuration of a controller.

The controller 11 is a functional block that is implemented by executing the above-mentioned program module. As illustrated in FIG. 5, the controller 11 includes a narrow area communication controller F1, a wide area communication processor F2, a service type determiner F3, a determination information acquirer F4, and a service target determiner F5. Some or all functions executed by the controller 11 may be implemented by hardware such as one IC or a plurality of ICs.

The narrow area communication controller F1 controls the operation of the narrow area communicator 12 and switches between communication on the control channel and communication on a service channel. Further, the narrow area communication controller F1 generates data to be transmitted from the narrow area communicator 12 based on the operating mode of the narrow area communicator 12, and causes the narrow area communicator 12 to transmit the generated data. Furthermore, the narrow area communication controller F1 acquires data received by the narrow area communicator 12 and supplies the acquired data to a different functional block (e.g., service type determiner F3).

The narrow area communication controller F1 is subdivided into two functional blocks, namely, a CCH communication processor F11 and an SCH communication processor F12. As is the case with the aforementioned roadside CCH communication processor G11 and roadside SCH communication processor G12, CCH denotes the control channel, and SCH denotes a service channel.

The CCH communication processor F11 performs a communication process that uses the control channel. That is, the CCH communication processor F11 corresponds to an onboard control channel communicator. The CCH communication processor F11 generates, for example, data to be transmitted on the control channel, and causes the narrow area communicator 12 to transmit the generated data. The data to be transmitted on the control channel may be generated by a different functional block. In such an instance, the CCH communication processor F11 acquires the data generated by such a different functional block and causes the narrow area communicator 12 to transmit the acquired data.

Further, the CCH communication processor F11 acquires data that is received while the narrow area communicator 12 is engaged in communication on the control channel. For example, the CCH communication processor F11 acquires a WSA distributed from the roadside unit 2.

The SCH communication processor F12 performs a communication process that uses a service channel. That is, the SCH communication processor F12 corresponds to an onboard service channel communicator. The SCH communication processor F12 generates, for example, data to be transmitted on a service channel, and causes the narrow area communicator 12 to transmit the generated data. Further, the SCH communication processor F12 acquires data that is received while the narrow area communicator 12 is engaged in communication on the control channel.

The wide area communication processor F2 not only controls the operation of the wide area communicator 13 and acquires data received by the wide area communicator 13, but also outputs predetermined data to the wide area communicator 13 and causes the wide area communicator 13 to transmit the predetermined data.

When a WSA is acquired by the CCH communication processor F11, the service type determiner F3 determines, based on the service list stored in the memory 11M and on the service type information (a service ID in the current example) included in the WSA, whether a service corresponding to the WSA is available to the subject terminal. The service corresponding to the WSA is a service provided by the roadside unit 2 from which the WSA is distributed.

More specifically, if the service ID included in the received WSA is registered in the service list, the service type determiner F3 determines that a service corresponding to the WSA is available to the subject terminal. By contrast, if the service ID included in the received WSA is not registered in the service list, the service type determiner F3 determines that the service corresponding to the WSA is unavailable to the subject terminal.

The determination information acquirer F4 acquires determination information that is used to determine whether a vehicle in which the subject terminal is mounted is targeted for a service corresponding to the received WSA. In the present embodiment, based on signals inputted, for example, from the GNSS receiver 14, the acceleration sensor 15, and the gyro sensor 16, the determination information acquirer F4 detects the current position of the subject vehicle successively (e.g., at 100 millisecond intervals) as the determination information.

The position information acquired by the GNSS receiver 14 may be corrected based on values detected by the acceleration sensor 15 and the gyro sensor 16 by using a well-known method. Further, the determination information acquirer F4 may autonomously estimate the current position based on values detected by the acceleration sensor 15 and the gyro sensor 16. The determination information acquirer F4 need not always perform a process of identifying the current position. An alternative is to let a position detector including the GNSS receiver perform a calculation process for identifying the current position and permit the determination information acquirer F4 to acquire the result of the calculation process.

Based on the current position of the subject vehicle acquired by the determination information acquirer F4, and on the target vehicle information included in a received WSA, the service target determiner F5 determines whether the subject vehicle is to receive a service provided by the roadside unit 2 from which the received WSA is distributed. More specifically, if the current position of the subject vehicle is within the service provision area (including its boundary), the service target determiner F5 determines that the subject vehicle is to receive a service provided by the roadside unit 2 from which the received WSA is distributed. By contrast, if the current position of the subject vehicle is outside the service provision area, the service target determiner F5 determines that the subject vehicle is not to receive a service provided by the roadside unit 2 from which the received WSA is distributed.

(WSA Reception-related Process)

A WSA reception-related process performed by the controller 11 will now be described with reference to the flowchart of FIG. 6. When a WSA transmitted from a roadside unit 2 is received, the WSA reception-related process is triggered to determine whether or not to initiate communication with the roadside unit 2 by using a service channel for receiving a service provided by the roadside unit 2.

Figure 6:
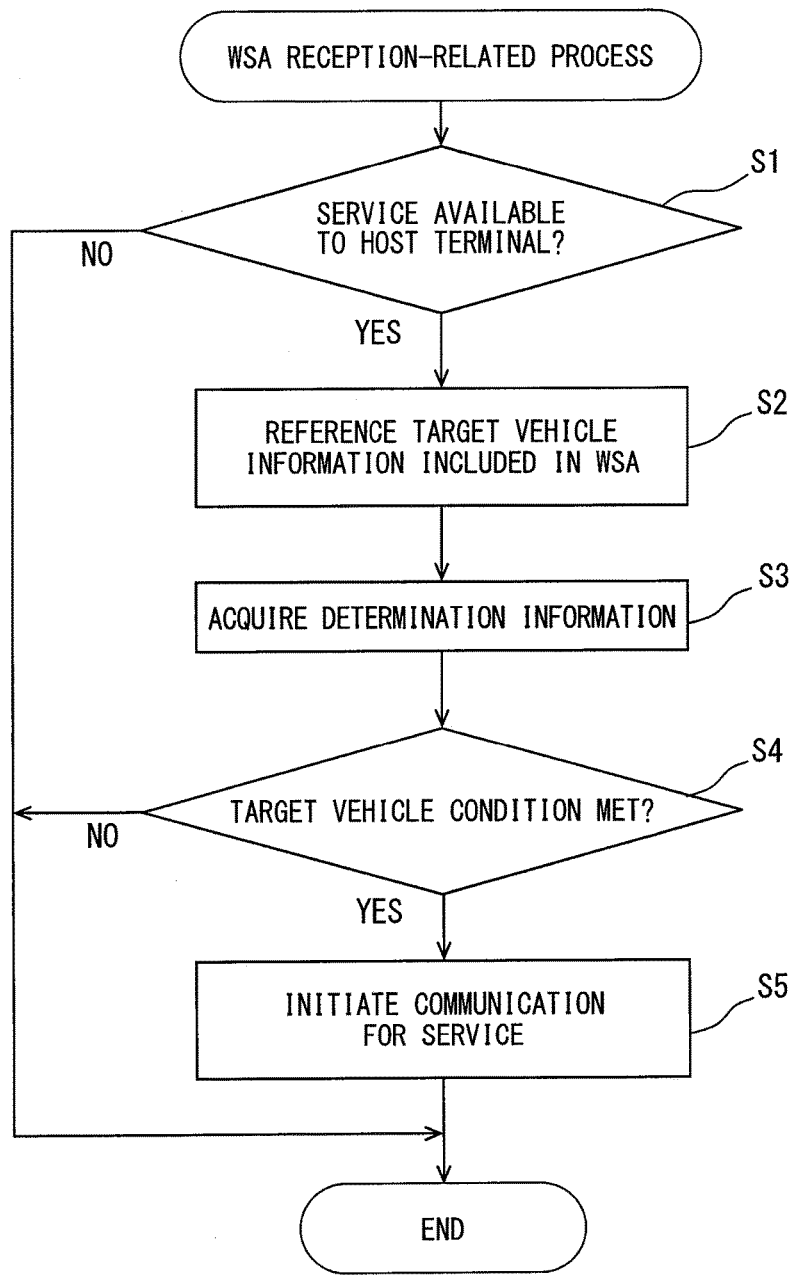
FIG. 6 is a flowchart illustrating a WSA reception-related process performed by the controller.

Accordingly, the flowchart of FIG. 6 may be started when the CCH communication processor F11 receives a WSA. At the beginning of this flowchart, it is assumed that the onboard unit 1 is not communicating with a different roadside unit 2 in order to receive a service provided by that roadside unit 2. That is, the WSA reception-related process may be performed upon each receipt of a WSA in a situation where communication is not established with any roadside unit 2 by using a service channel.

First of all, in step S1, based on the service type information included in the received WSA and on the service list stored in the memory 11M, the service type determiner F3 determines whether a service corresponding to the WSA is available to the subject terminal. If the service corresponding to the WSA is unavailable to the subject terminal, step S1 is "NO", and then the flow terminates. That is, the service channel indicated by the WSA does not open.

By contrast, if the service corresponding to the WSA is available to the subject terminal, step S1 is "YES", and then processing proceeds to step S2.

In step S2, the service target determiner F5 extracts the target vehicle information included in the WSA. Upon completion of step S2, processing proceeds to step S3. In step S3, the determination information acquirer F4 acquires the current position of the subject vehicle. Upon completion of step S3, processing proceeds to step S4.

In step S4, based on the current position of the subject vehicle acquired by the determination information acquirer F4, and on the target vehicle information included in the WSA, the service target determiner F5 determines whether the subject terminal is to receive a service provided by the roadside unit 2 from which the received WSA is distributed.

If the service target determiner F5 determines that the subject terminal is to receive a service provided by the roadside unit 2 from which the received WSA is distributed, step S4 is "YES", and then processing proceeds to step S5. By contrast, if the service target determiner F5 determines that the subject terminal is not to receive a service provided by the roadside unit 2 from which the received WSA is distributed, step S4 is "NO", and then the flow terminates. In this instance, the service channel indicated by the received WSA does not open.

In step S5, the narrow area communication controller F1 initiates communication with the roadside unit 2 by using the service channel indicated by the WSA.

(Operation of Present Embodiment)

According to the above-described WSA reception-related process, if the target vehicle condition is not met when the service type information included in a received WSA indicates a service available to the subject terminal (step S1: YES), the service channel indicated by the WSA does not open (step S4: NO). More specifically, if the current position of the subject vehicle is not within the service provision area indicated by the target vehicle information, the service channel indicated by the WSA does not open.

Consequently, even if the onboard unit 1 receives a WSA that is not to be received by the onboard unit 1, such as a WSA for vehicles traveling in the opposite lane, the service channel indicated by the WSA does not open. A situation where the onboard unit 1 receives a WSA that is not to be received may be, for example, a situation where a WSA transmitted from the roadside unit 2 is reflected from the body of a different vehicle and delivered into an area (i.e., an area outside the service provision area) where a vehicle not targeted for the service travels.

WSA that is not to be received is a WSA corresponding to a service unnecessary for the subject vehicle. That is, opening a service channel for a WSA that is not to be received is opening a service channel for an unnecessary service.

In a conventional configuration, whether a service channel indicated by a WSA should be opened is determined simply based on service type information included in the WSA without using the target vehicle information to determine whether or not to open the service channel. In the conventional configuration, therefore, it is probable that a service channel for an unnecessary service may be opened.

The configuration according to the present embodiment is different from the conventional configuration. More specifically, even if a received WSA is a WSA that is not to be received and a service corresponding to the WSA is available to the subject terminal, a service channel indicated by the WSA does not open when the service target determiner F5 determines that the subject terminal is not to receive the service. That is, the configuration according to the present embodiment inhibits the opening of an unnecessary service channel.

Figure 7:
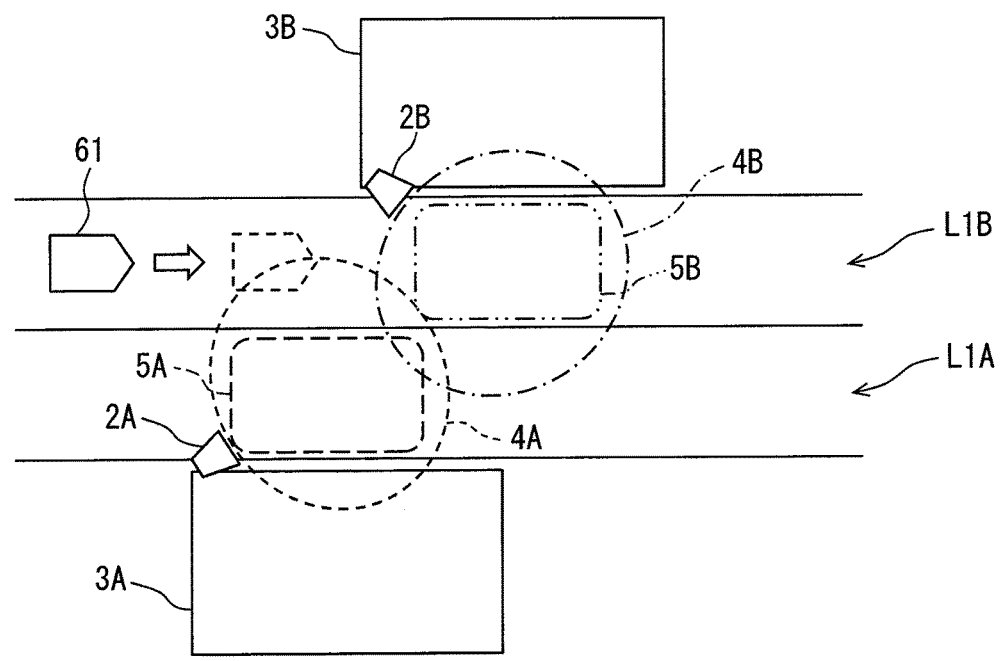
FIG. 7 is a diagram illustrating operations and advantageous effects of the embodiment.

Concrete examples of advantageous effects produced by the present embodiment will now be described with reference to FIG. 7. FIG. 7 illustrates a scene where two stores 3A, 3B equipped respectively with roadside units 2A, 2B for providing a payment service are located on opposite side of a road having two adjacent lanes L1A, L1B to substantially face each other.

The store 3A is located on the lane L1A side of the road. The roadside unit 2A managed by the store 3A provides a payment service to a vehicle traveling in the lane L1A. The store 3B is located on the lane L1B side of the road. The roadside unit 2B managed by the store 3B provides a payment service to a vehicle traveling in the lane L1B.

An oval area enclosed by a short-dashed line in FIG. 7 is the wireless communication area 4A of the roadside unit 2A. An oval area enclosed by a one-dot chain line is the wireless communication area 4B of the roadside unit 2B. An area enclosed by a long-dashed line is the service provision area 5A of the roadside unit 2A managed by the store 3A. An area enclosed by a two-dot chain line is the service provision area 5B of the roadside unit 2B managed by the store 3B. When a plurality of roadside units 2 are close to each other as described above, they preferably use different service channels in order to avoid interference.

A vehicle 61 is a vehicle in which the onboard unit 1 is mounted, and traveling in the lane L1B and toward the store 3B. It is assumed that the payment service provided by the roadside unit 2A and the payment service provided by the roadside unit 2B are both registered as a service available to the subject terminal of the onboard unit 1.

As illustrated in FIG. 7, the wireless communication area 4A of the roadside unit 2A is formed to reach the lane L1B where vehicles not supposed to receive a service from the roadside unit 2A travel. In this instance, the vehicle 61 enters the wireless communication area 4A formed by the roadside unit 2A before entering the wireless communication area 4B formed by the roadside unit 2B. That is, the vehicle 61 receives a WSA transmitted from the roadside unit 2A before receiving a WSA transmitted from the roadside unit 2B.

In the above instance, if the onboard unit 1 does not determine, based on the target vehicle information, whether or not to open a service channel, and simply determines, based on the service type information included in a WSA as in the conventional configuration, whether or not to open a service channel indicated by the WSA, the onboard unit 1 initiates communication on a service channel with the roadside unit 2A.

However, the roadside unit 2A provides the payment service to a vehicle traveling in the lane L1A. Therefore, the service provided by the roadside unit 2A is not useful (i.e., not necessary) for the onboard unit 1. As a result, the onboard unit 1 opens a service channel for an unnecessary service.

Further, once a service channel is opened, the onboard unit 1 cannot open a different service channel until a predetermined communication termination procedure is completed. Therefore, when a service channel for the roadside unit 2A is opened, it is anticipated that the onboard unit 1 may delay the initiation of communication with the roadside unit 2B on a service channel useful for the vehicle 61 or may fail to establish such communication.

In order to address the above problem when determining whether or not to open a service channel corresponding to a received WSA, the onboard unit 1 according to the present embodiment not only determines whether the service type corresponding to the received WSA is available to the subject terminal, but also determines whether the current position of the subject vehicle is within the service provision area indicated by the target vehicle information.

In a situation indicated, for example, in FIG. 7, the current position of the vehicle 61 is outside the service provision area 5A of the roadside unit 2A. Thus, the service channel for using a service provided by the roadside unit 2A does not open although the provided service is available to the subject terminal of the onboard unit 1. This inhibits the opening of a service channel for a service unnecessary for the onboard unit 1.

Further, the present embodiment also suppresses the possibility of the onboard unit 1 delaying the opening of a service channel for a necessary service or failing to open the service channel although such problems may be otherwise caused by opening a service channel for an unnecessary service.

As mentioned earlier, the wireless communication area 4A of the roadside unit 2A is preferably formed to coincide with the service provision area 5A, that is, an area that is passed through by vehicles targeted for the service.

However, due to various factors, the wireless communication area is not always formed to coincide with the service provision area. Further, even when a designed wireless communication area coincides with the service provision area, a WSA transmitted from the roadside unit 2 may be reflected, for example, from the body of a vehicle traveling in the wireless communication area and delivered to the outside of the designed wireless communication area.

Even when a WSA is received, due to such various factors, by a vehicle that is not to receive a service, the present embodiment inhibits the onboard unit 1 from opening an unnecessary channel based on the received WSA.

The present embodiment has been described on the assumption that the service provision area is used as the target vehicle information, and that the service target determiner F5 checks whether the current position acquired by the determination information acquirer F4 is within the service provision area in order to determine whether the subject terminal is to receive a relevant service.

However, a subject vehicle position acquired by the determination information acquirer F4 may deviate from an actual subject vehicle position. For example, if the GNSS receiver 14 is unable to receive radio waves from a GNSS satellite or positioning accuracy is estimated to be outside a predetermined permissible range from the viewpoint of the number of acquired satellites or the signal-to-noise ratio of received signals, the service target determiner F5 may inadvertently determine, based on an incorrect subject vehicle position, whether the subject terminal is to receive a relevant service.

Consequently, if the accuracy of the subject vehicle position, which is determined depending on the reception by the GNSS receiver 14, does not meet a predefined standard, whether a service channel is to be opened may be determined based on the same determination criteria as in the conventional configuration without allowing the service target determiner F5 to make a determination.

While the present disclosure has been described above in conjunction with an embodiment, the present disclosure is not limited to the above-described embodiment. The following modifications are also embodiments of the present disclosure. Further, in addition to the following modifications, various other modifications may be made without departing from the spirit and scope of the present disclosure.

<First Modification>

The foregoing embodiment has been described on the assumption that the service provision area is used as the target vehicle information, and that whether a service channel is to be opened is determined depending on whether the current position of the subject vehicle is within the service provision area. However, the present disclosure is not limited to such a scheme. For example, the travel direction of a vehicle in which the onboard unit 1 is mounted may be used as the target vehicle information. The travel direction of a vehicle corresponds to the movement direction of the onboard unit 1.

The roadside unit 2 in the above-described first modification successively broadcasts a WSA that includes, as the target vehicle information, information indicative of the travel direction of a service target vehicle.

Further, the determination information acquirer F4 in the first modification identifies the travel direction of the subject vehicle based on the result of detection by, for example, the gyro sensor 16. Obviously, the method of identifying the travel direction of the subject vehicle is not limited to the above. Alternatively, a well-known method may be used. The travel direction of the subject vehicle may be identified, for example, from temporal changes in the current position of the subject vehicle.

If the travel direction indicated by the target vehicle information in a received WSA coincides (or substantially coincides) with the travel direction of the subject vehicle, the service target determiner F5 may determine that the subject vehicle is to receive a service provided by the roadside unit 2 from which the received WSA is distributed. By contrast, if the travel direction indicated by the target vehicle information in the received WSA does not coincide with the travel direction of the subject vehicle, the service target determiner F5 may determine that the subject vehicle is not to receive a service provided by the roadside unit 2 from which the received WSA is distributed.

The first modification described above provides the same advantageous effects as the foregoing embodiment. Operations and advantageous effects of the first modification will be described in detail below with reference to FIG. 8.

Figure 8:
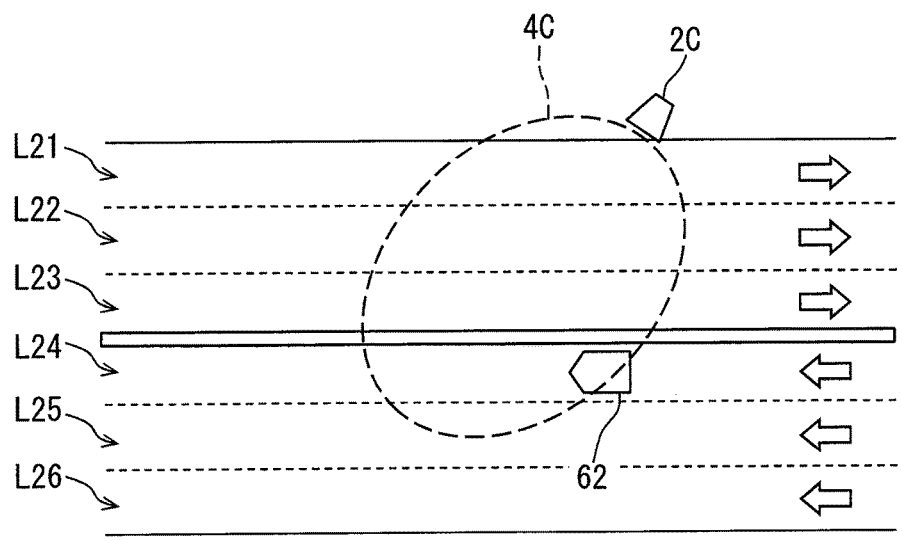
FIG. 8 is a diagram illustrating operations and advantageous effects of a first modification.

FIG. 8 illustrates a situation where a roadside unit 2C is installed along a lane L21 of a road (e.g., a highway) having a plurality of lanes L21-L26 in order to distribute driving support information to vehicles traveling in the lanes L21-L23.

White arrows in FIG. 8 indicate the travel directions of the lanes L21-L26. The lanes L21-L23 are for vehicles traveling rightward in FIG. 8. The lanes L24-L26 are for vehicles traveling leftward in FIG. 8. A vehicle 62 traveling in the lane L24 has a registered onboard unit 1 that is capable of allowing its subject terminal to use a traffic information distribution service.

An oval area enclosed by a broken line in FIG. 8 is the wireless communication area 4C of the roadside unit 2C. As illustrated in FIG. 8, the wireless communication area 4C of the roadside unit 2C is formed to reach the lane L24 and the lane L25.

Here, the roadside unit 2C is a roadside unit 2 that distributes the driving support information to vehicles traveling in the lanes L21-L23. Therefore, the driving support information distributed from the roadside unit 2C is useful for vehicles traveling in the lanes L21-L23. That is, the driving support information distributed from the roadside unit 2C is unnecessary for vehicles traveling in the lanes L24-L25 whose travel directions are opposite to those of the lanes L21-L23.

In the above situation, if the onboard unit 1 mounted in the vehicle 62 determines, based only on the service type information included in a WSA as in the conventional configuration, whether or not to open a service channel indicated by the WSA, the onboard unit 1 initiates communication on the service channel with the roadside unit 2C. That is, the onboard unit 1 acquires the driving support information distributed from the roadside unit 2C.

However, the driving support information distributed from the roadside unit 2C is unnecessary for the vehicle 62. That is, the service provided by the roadside unit 2C is not useful (i.e., not necessary) for the onboard unit 1 mounted in the vehicle 62. Consequently, the onboard unit 1 in the conventional configuration opens a service channel for an unnecessary service.

In order to address the above problem, the roadside unit 2C configured according to the first modification distributes a WSA including the target vehicle information indicative that vehicles traveling rightward in FIG. 8 are to receive the traffic information distribution service.

When determining whether or not to open a service channel for a received WSA, the onboard unit 1 in the vehicle 62 not only determines whether the service type corresponding to the received WSA is available to the subject terminal, but also determines whether the travel direction of the subject vehicle coincides with the travel direction indicated by the target vehicle information.

More specifically, in the situation illustrated in FIG. 8, the onboard unit 1 does not open a service channel for the roadside unit 2C when the travel direction of the subject vehicle does not coincide with the travel direction indicated by the target vehicle information. That is, the first modification inhibits the onboard unit 1 from opening an unnecessary service channel based on a received WSA.

Incidentally, there is an upper limit of the number of onboard units 1 that can be concurrently wirelessly connected to the roadside unit 2C, from the viewpoint of the processing capacity of the roadside unit 2 and the data rate of a service channel. If vehicles in an area not designated as a communication target, such as vehicles traveling in the lanes L24-L25 as indicated in FIG. 8, attempt to communicate with the roadside unit 2C, the communication capacity of the roadside unit 2C may be exceeded.

However, when the target vehicle information is introduced as described in conjunction with the first modification or the foregoing embodiment, vehicles attempting to communicate with the roadside unit 2C can be limited. This reduces the possibility of exceeding the communication capacity of the roadside unit 2C.

Meanwhile, if the roadside unit 2 is adapted to provide a payment service, the wireless communication area formed by the roadside unit 2 is not considerably large. Even if a density of vehicles mounted with the onboard units 1 in the wireless communication area is large, the communication capacity of the roadside unit 2 is not likely to be exceeded. However, it is conceivable that the roadside unit 2 adapted to provide the traffic information distribution service forms a larger wireless communication area than the roadside unit 2 adapted to provide the payment service forms. Accordingly, the possibility of exceeding the communication capacity of the roadside unit 2 is high. That is, the effect of reducing the possibility of exceeding the communication capacity by the introduction of the target vehicle information is enhanced when the roadside unit 2 forms a relatively large wireless communication area.

<Second Modification>

The foregoing assumes that the service provision area and the travel direction of a vehicle are used as the target vehicle information. However, the present disclosure is not limited to such a scheme. For example, the travel speed of a vehicle in which the onboard unit 1 is mounted may be used as the target vehicle information. That is, the travel speed range of a vehicle targeted for service provision may be defined as the target vehicle condition. The travel speed of a vehicle corresponds to the movement speed of the onboard unit 1.

The roadside unit 2 in the above-described second modification successively broadcasts a WSA that includes, as the target vehicle information, information indicative of the travel speed range of a vehicle that is to receive a service.

Further, the determination information acquirer F4 in the second modification identifies the travel speed of the subject vehicle by integrating values detected, for example, by the acceleration sensor 15. Obviously, the method of identifying the travel speed of the subject vehicle is not limited to the above. Alternatively, a well-known method may be used. For example, an alternative is to chronologically store information indicative of the current position of the subject vehicle in the memory 11M and identify the travel speed of the subject vehicle from the distance moved by per unit time.

If the travel speed of the subject vehicle is within the travel speed range indicated by the target vehicle information in a received WSA, the service target determiner F5 determines that the subject vehicle is to receive a service provided by the roadside unit 2 from which the received WSA is distributed. By contrast, if the travel speed of the subject vehicle is not within the travel speed range indicated by the target vehicle information in the received WSA, the service target determiner F5 determines that the subject vehicle is not to receive a service provided by the roadside unit 2 from which the received WSA is distributed.

The second modification described above provides the same advantageous effects as the foregoing embodiment. Operations and advantageous effects of the first modification will be described in detail below with reference to FIG. 9.

Figure 9:
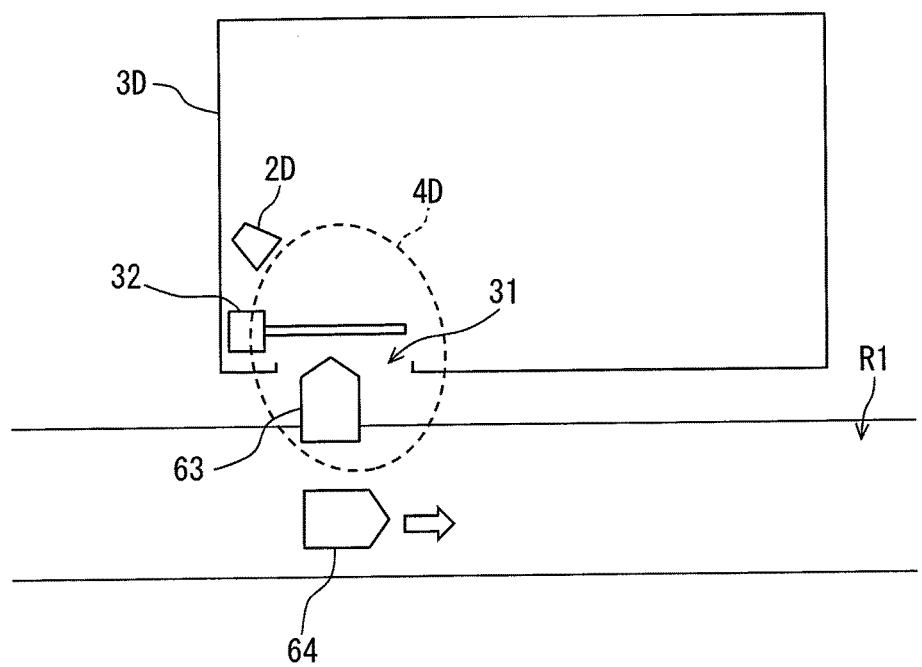
FIG. 9 is a diagram illustrating operations and advantageous effects of a second modification.

FIG. 9 illustrates a situation where a vehicle 63 in which the onboard unit 1 is mounted is about to enter a parking lot 3D along a road R1. An entrance/exit 31 of the parking lot 3D faces the road R1 and is equipped with a gate 32. A roadside unit 2D is disposed near the entrance/exit 31 to provide a payment service for paying for parking time. An area enclosed by a broken line in FIG. 9 is the wireless communication area 4D of the roadside unit 2D. The wireless communication area 4D is formed to include a desired area around the entrance/exit 31.

A vehicle 64 in FIG. 9 travels on the road R1 in front of the parking lot 3D at a predetermined speed (e.g., 30 km/h). It is assumed that the onboard unit 1 is mounted in both the vehicle 63 and the vehicle 64 and registered so as to permit the subject terminal to use the payment service provided by the roadside unit 2D.

In the above-described situation, the vehicle 63 is about to use the parking lot 3D. Therefore, the onboard unit 1 in the vehicle 63 preferably opens a service channel based on a WSA distributed from the roadside unit 2D. Meanwhile, the vehicle 64 does not use the parking lot 3D in the situation illustrated in FIG. 9. Therefore, the onboard unit 1 in the vehicle 64 preferably refrains from opening the service channel based on the WSA distributed from the roadside unit 2D.

Incidentally, when a vehicle traveling on the road R1 enters the parking lot 3D, it is generally conceivable that the vehicle stops temporarily, for example, for safety confirmation. When such a vehicle behavior is taken into consideration, a vehicle traveling in the vicinity of the entrance/exit 31 at a predetermined speed (e.g., 10 km/h) or lower is likely to use the parking lot 3D. In contrast, a vehicle traveling at a speed higher than the predetermined speed is relatively unlikely to use the parking lot 3D.

Consequently, when the roadside unit 2D distributes a WSA including the target vehicle information indicative that a service target is vehicles traveling at the predetermined speed or lower, the onboard unit 1 requiring no communication for receiving the service is inhibited from opening a service channel. More specifically, the onboard unit 1 in the vehicle 63 opens a service channel based on the WSA distributed from the roadside unit 2D, and the onboard unit 1 in the vehicle 64 does not open the service channel based on the WSA distributed from the roadside unit 2D.

In short, the above-described configuration also inhibits the onboard unit 1 from opening an unnecessary service channel based on a received WSA. If, for example, vehicles traveling on a highway are a service target, the WSA to be distributed should include the target vehicle information indicative that the service target is vehicles traveling at a predetermined threshold speed (e.g., 60 km/h) or higher. That is, the travel speed range of vehicles targeted for service provision may be appropriately designed based on an estimated travel speed of target vehicles.

<Third Modification>

The above-described variations of the target vehicle condition may be combined as appropriate. For example, the target vehicle condition may be defined so as to cover vehicles that exist in the service provision area and travel at a predetermined speed or lower. Further, the condition for the travel direction may be combined with the condition for the travel speed. In order to handle the variations of the target vehicle condition, the determination information acquirer F4 may successively acquire three different items of information, namely, the current position, travel speed, and travel direction of the subject vehicle. Obviously, an alternative is to let the determination information acquirer F4 successively acquire two of the three different items of information.

<Fourth Modification>

The foregoing assumes that the onboard unit 1 determines whether or not to open a service channel corresponding to a received WSA. Alternatively, however, the result of determination by the service target determiner F5 may be used to determine whether or not to close an opened service channel.

More specifically, if the status of the subject vehicle changes and does not meet the target vehicle condition indicated by a WSA while a predetermined service channel is open based on the WSA, the SCH communication processor F12 may close the service channel. Here, closing the service channel is to terminate communication on the service channel by performing a predetermined communication termination procedure with a communication counterparty terminal engaged in communication on the service channel.

<Fifth Modification>

The foregoing assumes that once a service channel is opened, the onboard unit 1 cannot open a different service channel until completion of a predetermined communication termination procedure without regard to the type of service corresponding to the open service channel. However, the present disclosure is not limited to such a scheme. Alternatively, the onboard unit 1 may be inhibited from opening such a different service channel until completion of the predetermined communication termination procedure only when a currently open service channel is for a payment service or other predetermined service in which communication stability is important.

<Sixth Modification>

The foregoing assumes that the roadside unit 2 functions as the service provider terminal. However, the present disclosure is not limited to such a scheme. For example, the onboard unit 1 may be used as the service provider terminal. That is, the service provider terminal may be a communication terminal used in a movable object.

Further, the foregoing assumes that the communication terminals establish communication in compliance with the WAVE standard. Alternatively, however, the communication terminals may establish communication in compliance with a different communication standard corresponding to the WAVE standard. In such an instance, a channel used to establish substantial communication for providing (and receiving) a service corresponds to a service channel, and a channel used to distribute information for initiating communication on such a service channel (i.e., information corresponding to a WSA) corresponds to the control channel.

While the present disclosure has been described above in conjunction with an embodiment, the present disclosure is not limited to the above-described embodiment and modifications. The embodiment and modifications may be variously modified. For example, technical elements described in conjunction with the foregoing embodiment and modifications may be appropriately combined to obtain an embodiment that falls within the present disclosure.

What is claimed is:

1. A mobile communication system comprising:
   at least one onboard terminal that is used in a vehicle; and
   at least one service provider terminal that wirelessly communicates with the onboard terminal to perform a series of processes for providing a predetermined service to the onboard terminal,
   wherein the service provider terminal includes
      a provider service channel communicator that communicates with the onboard terminal to provide the service by using any one of a plurality of preassigned service channels, and
      a provider control channel communicator that distributes service initiation information for initiating communication on the service channel by using a preassigned control channel, the control channel being different from the service channels;
   wherein the service initiation information includes
      service type information that indicates type of the service,
      service channel information that enables the onboard terminal having received the service initiation information to identify, of the plurality of service channels, the service channel used for the service provider terminal to communicate with the onboard terminal, and target terminal information indicative of a condition for the onboard terminal targeted for the service, wherein the onboard terminal includes an onboard control channel communicator that communicates with the service provider terminal by using the control channel and receives at least the service initiation information, an onboard service channel communicator that communicates with the service provider terminal by using one of the plurality of service channels determined by the service channel information included in the service initiation information received by the onboard control channel communicator, a service memory that memorizes type of service available to the onboard terminal itself, a service type determiner that determines, based on the service type information included in the service initiation information and on the type of service available to the onboard terminal itself stored in the service memory, whether the service provided by the service provider terminal is available to the onboard terminal itself, a determination information acquirer that acquires determination information, the determination information being information about the onboard terminal itself and used to determine whether the onboard terminal itself is an onboard terminal targeted for the service from the service provider terminal, and a service target determiner that determines, based on the target terminal information included in the service initiation information and on the determination information acquired by the determination information acquirer, whether the onboard terminal itself is the onboard terminal targeted for the service, wherein:

when the service type determiner determines that the service provided by the service provider terminal is available to the onboard terminal itself and the service target determiner determines that the onboard terminal itself is the onboard terminal targeted for the service, the onboard service channel communicator initiates communication with the service provider terminal by using the service channel;

when the service type determiner determines that the service provided by the service provider terminal is not available to the onboard terminal itself or when the service target determiner determines that the onboard terminal itself is not the onboard terminal targeted for the service, the onboard service channel communicator does not initiate communication with the service provider terminal by using the service channel;

the target terminal information indicates a movement direction of the onboard terminal adapted to receive the service;

the determination information acquirer acquires a movement direction of the onboard terminal itself as the determination information;

when the movement direction of the onboard terminal acquired by the determination information acquirer coincides with the movement direction indicated by the target terminal information, the service target determiner determines that the onboard terminal itself is the onboard terminal targeted for the service; and when the movement direction of the onboard terminal itself does not coincide with the movement direction indicated by the target terminal information, the service target determiner determines that the onboard terminal is not the onboard terminal targeted for the service.

2. The mobile communication system according to claim 1, wherein when communication on the service channel is already established with a first service provider terminal, the onboard service channel communicator does not initiate communication with a second service provider terminal until the communication with the first service provider terminal terminates.

3. The mobile communication system according to claim 2, wherein:

the target terminal information indicates a service provision area, the service provision area being an area where the onboard terminal to be provided with the service is supposed to exist;

the determination information acquirer acquires a current position of the onboard terminal as the determination information;

when the current position of the onboard terminal acquired by the determination information acquirer is within the service provision area, the service target determiner determines that the onboard terminal is the onboard terminal targeted for the service; and when the current position of the onboard terminal is outside the service provision area, the service target determiner determines that the onboard terminal is not the onboard terminal targeted for the service.

4. The mobile communication system according to claim 1, wherein:

while the onboard service channel communicator is communicating with the service provider terminal by using the service channel, the service target determiner successively determines whether the determination information acquired by the determination information acquirer meets the condition indicated by the target terminal information included in the service initiation information that triggered initiation of the currently established communication on the service channel; and when the service target determiner determines that the determination information does not meet the condition, the onboard service channel communicator terminates the communication on the service channel with the service provider terminal.

5. An onboard terminal that performs a series of processes to receive a predetermined service by wirelessly communicating with a service provider terminal adapted to provide the predetermined service, the onboard terminal comprising:

an onboard control channel communicator that communicates with the service provider terminal by using a preassigned control channel and receives service initiation information distributed from the service provider terminal; and an onboard service channel communicator that communicates with the service provider terminal by using one of a plurality of preassigned service channels, the service channels being different from the control channel, wherein the service initiation information includes service type information that indicates type of the service provided by the service provider terminal, service channel information that enables the onboard terminal to identify, of the plurality of service channels, the service channel used for the service provider terminal to communicate with the onboard terminal, and
target terminal information that indicates a condition for a communication terminal targeted for the service,
wherein the onboard terminal further comprises
a service memory that stores type of service available to the onboard terminal itself,
a service type determiner that determines, based on the service type information included in the service initiation information and on the type of service available to the onboard terminal itself stored in the service memory, whether the service provided by the service provider terminal is available to the onboard terminal itself,
a determination information acquirer that acquires determination information, the determination information being information about the onboard terminal itself and used to determine whether the onboard terminal itself is a communication terminal adapted to receive the service from the service provider terminal, and
a service target determiner that determines, based on the target terminal information included in the service initiation information and on the determination information acquired by the determination information acquirer, whether the onboard terminal itself is a communication terminal targeted for the service,
wherein:
when the service type determiner determines that the service provided by the service provider terminal is available to the onboard terminal itself and the service target determiner determines that the onboard terminal itself is the communication terminal targeted for the service, the onboard service channel communicator initiates communication with the service provider terminal by using one of the service channels determined by the service channel information included in the service initiation information; and
when the service type determiner determines that the service provided by the service provider terminal is not available to the onboard terminal itself or when the service target determiner determines that the onboard terminal itself is not the communication terminal targeted for the service, the onboard service channel communicator does not initiate communication with the service provider terminal by using the service channel determined by the service channel information included in the service initiation information, the service channel being one of the plurality of service channels;
the target terminal information indicates a movement direction of the onboard terminal adapted to receive the service;
the determination information acquirer acquires a movement direction of the onboard terminal itself as the determination information;
when the movement direction of the onboard terminal acquired by the determination information acquirer coincides with the movement direction indicated by the target terminal information, the service target determiner determines that the onboard terminal itself is the onboard terminal targeted for the service; and
when the movement direction of the onboard terminal itself does not coincide with the movement direction indicated by the target terminal information, the service target determiner determines that the onboard terminal is not the onboard terminal targeted for the service.

6. A mobile communication system comprising:
at least one onboard terminal that is used in a vehicle; and
at least one service provider terminal that wirelessly communicates with the onboard terminal to perform a series of processes for providing a predetermined service to the onboard terminal,
wherein the service provider terminal includes
a provider service channel communicator that communicates with the onboard terminal to provide the service by using any one of a plurality of preassigned service channels, and
a provider control channel communicator that distributes service initiation information for initiating communication on the service channel by using a preassigned control channel, the control channel being different from the service channels;
wherein the service initiation information includes
service type information that indicates type of the service,
service channel information that enables the onboard terminal having received the service initiation information to identify, of the plurality of service channels, the service channel used for the service provider terminal to communicate with the onboard terminal, and
target terminal information indicative of a condition for the onboard terminal targeted for the service,
wherein the onboard terminal includes
an onboard control channel communicator that communicates with the service provider terminal by using the control channel and receives at least the service initiation information,
an onboard service channel communicator that communicates with the service provider terminal by using one of the plurality of service channels determined by the service channel information included in the service initiation information received by the onboard control channel communicator,
a service memory that memorizes type of service available to the onboard terminal itself,
a service type determiner that determines, based on the service type information included in the service initiation information and on the type of service available to the onboard terminal itself stored in the service memory, whether the service provided by the service provider terminal is available to the onboard terminal itself,
a determination information acquirer that acquires determination information, the determination information being information about the onboard terminal itself and used to determine whether the onboard terminal itself is an onboard terminal targeted for the service from the service provider terminal, and
a service target determiner that determines, based on the target terminal information included in the service initiation information and on the determination information acquired by the determination information acquirer, whether the onboard terminal itself is the onboard terminal targeted for the service,
wherein:
when the service type determiner determines that the service provided by the service provider terminal is available to the onboard terminal itself and the service target determiner determines that the onboard terminal itself is the onboard terminal targeted for the service, the onboard service channel communicator initiates communication with the service provider terminal by using the service channel;

when the service type determiner determines that the service provided by the service provider terminal is not available to the onboard terminal itself or when the service target determiner determines that the onboard terminal itself is not the onboard terminal targeted for the service, the onboard service channel communicator does not initiate communication with the service provider terminal by using the service channel; the target terminal information indicates a movement speed range of the onboard terminal adapted to receive the service;

the determination information acquirer acquires a movement speed of the onboard terminal as the determination information;

when the movement speed of the onboard terminal acquired by the determination information acquirer is within the movement speed range indicated by the target terminal information, the service target determiner determines that the onboard terminal is the onboard terminal targeted for the service; and when the movement speed of the onboard terminal is outside the movement speed range indicated by the target terminal information, the service target determiner determines that the onboard terminal is not targeted for the service.

7. The mobile communication system according to claim 6, wherein when communication on the service channel is already established with a first service provider terminal, the onboard service channel communicator does not initiate communication with a second service provider terminal until the communication with the first service provider terminal terminates.

8. The mobile communication system according to claim 7, wherein:

the target terminal information indicates a service provision area, the service provision area being an area where the onboard terminal to be provided with the service is supposed to exist;

the determination information acquirer acquires a current position of the onboard terminal as the determination information;

when the current position of the onboard terminal acquired by the determination information acquirer is within the service provision area, the service target determiner determines that the onboard terminal is the onboard terminal targeted for the service; and when the current position of the onboard terminal is outside the service provision area, the service target determiner determines that the onboard terminal is not the onboard terminal targeted for the service.

9. The mobile communication system according to claim 8, wherein:

while the onboard service channel communicator is communicating with the service provider terminal by using the service channel, the service target determiner successively determines whether the determination information acquired by the determination information acquirer meets the condition indicated by the target terminal information included in the service initiation information that triggered initiation of the currently established communication on the service channel; and when the service target determiner determines that the determination information does not meet the condition, the onboard service channel communicator terminates the communication on the service channel with the service provider terminal.

* * * * *